United States Patent
Co et al.

(10) Patent No.: US 10,005,387 B2
(45) Date of Patent: Jun. 26, 2018

(54) VEHICLE LOCATOR SYSTEM

(71) Applicant: Ford Global Technologies, LLC, Dearborn, MI (US)

(72) Inventors: Juanito Yu Co, Ann Arbor, MI (US); Ryan Craig, Harrison Township, MI (US); Helen Chan Co, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 14/489,783

(22) Filed: Sep. 18, 2014

(65) Prior Publication Data
US 2016/0082880 A1   Mar. 24, 2016

(51) Int. Cl.
*B60Q 1/48* (2006.01)
*B60Q 1/26* (2006.01)
*H01Q 1/32* (2006.01)
*G05B 1/00* (2006.01)

(52) U.S. Cl.
CPC ............ *B60Q 1/482* (2013.01); *B60Q 1/2611* (2013.01); *H01Q 1/3291* (2013.01); *B60Q 2900/30* (2013.01)

(58) Field of Classification Search
CPC ......... G01S 2205/002; G01S 2205/008; G01S 5/0009; G08B 21/24; G08B 3/10; H04W 4/02; B60Q 1/2611; B60R 2300/406; B60C 23/00
USPC .............. 701/2, 301; 340/425.5, 426.1, 457; 455/456.1, 345
See application file for complete search history.

(56) References Cited

U.S. PATENT DOCUMENTS

| | | |
|---|---|---|
| 2,252,395 A | 8/1941 | Cohen |
| 2,522,189 A | 9/1950 | Morrow |
| 2,744,189 A | 5/1956 | Wudyka |
| 3,696,334 A | 10/1972 | Demeter |
| 4,020,335 A | 4/1977 | Bisceglia |
| 4,039,894 A | 8/1977 | Gardner, III |
| 4,051,361 A | 9/1977 | Lichon et al. |
| 4,309,741 A | 1/1982 | Smith |
| 4,598,339 A | 7/1986 | Ainsworth et al. |
| 5,777,580 A * | 7/1998 | Janky ............ G01S 1/045 342/457 |
| 5,786,758 A * | 7/1998 | Bullock ......... B60Q 1/482 116/202 |

(Continued)

OTHER PUBLICATIONS

Wireless Remote RGB Controller With Key Fobs, http://www.superbrightleds.com/moreinfo/controllers/universal-remote-control-with-key-fobs-rgb/1533/, pp. 1-6.

(Continued)

*Primary Examiner* — Gertrude Arthur Jeanglaude
(74) *Attorney, Agent, or Firm* — Frank MacKenzie Brooks Kushman P.C.

(57) ABSTRACT

A vehicle locator system may include a sensor in communication with a lighting system, a wireless transceiver, an illumination assembly received within a housing, and a controller. The controller may be configured to command the illumination assembly to emit light according to a first pattern, responsive to a communication from a remote device received through the wireless transceiver. The communication may include a request to operate the illumination assembly in a vehicle locator mode, while a vehicle ignition is off.

16 Claims, 2 Drawing Sheets

(56) References Cited

U.S. PATENT DOCUMENTS

| | | | | |
|---|---|---|---|---|
| 6,377,222 | B1 | 4/2002 | Nicholson | |
| 6,580,368 | B1* | 6/2003 | Jacobs | B60Q 1/482 |
| | | | | 116/209 |
| 7,119,679 | B1* | 10/2006 | Crom | B60Q 1/482 |
| | | | | 340/425.5 |
| D585,435 | S | 1/2009 | Wafer | |
| 2002/0159270 | A1* | 10/2002 | Lynam | B60K 35/00 |
| | | | | 362/492 |
| 2006/0276199 | A1* | 12/2006 | Flick | H04W 48/04 |
| | | | | 455/456.1 |
| 2013/0335212 | A1* | 12/2013 | Purks | B60Q 1/34 |
| | | | | 340/435 |
| 2014/0361904 | A1* | 12/2014 | Gaboury | G08B 3/10 |
| | | | | 340/692 |

OTHER PUBLICATIONS

Car Auto Decorative Antenna With LED Sensor—Colorful Flash Light—Anti-static—Anti-Knock Ik-072 (SZC2341), http://www.online-wholesale.net/wholesale/car-auto-decorative-antenna-with-led-sens . . . pp. 1-2.

DC 12V Blue LED Light Design Decorative Antenna for Car Truck, http://www.sourcingmap.com/dc-12v-blue-led-light-design-decorative-antenna-for-ca . . . , pp. 1-2.

LED Antenna Topper, http://www.glowwhips.com/LED-Antenna-Topper_p_61.html, pp. 1-4.

Universal 12V Remote Control, http://www.streetglow.com/Catalog/12VREMOTE_2, 1 page.

* cited by examiner

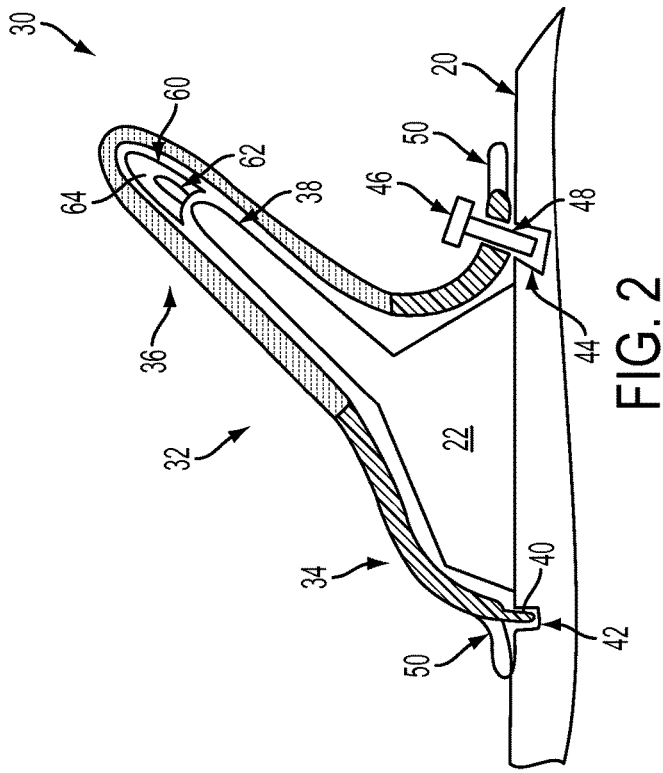
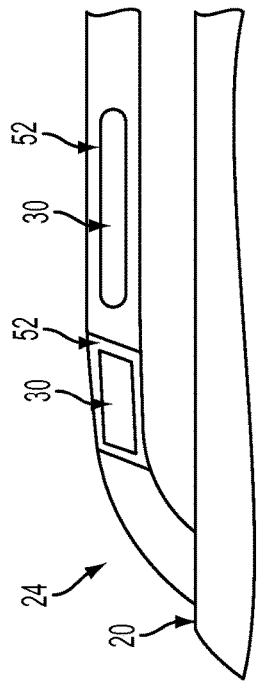
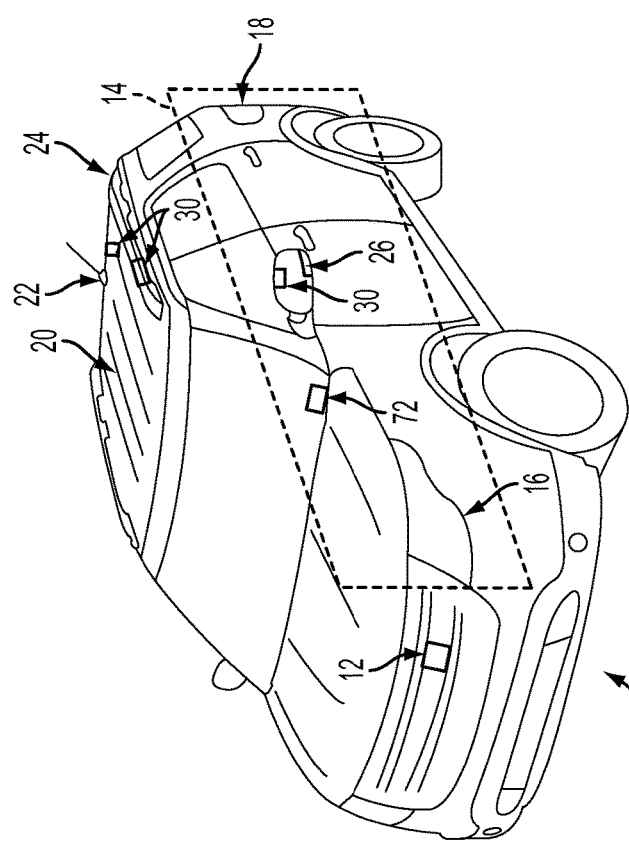

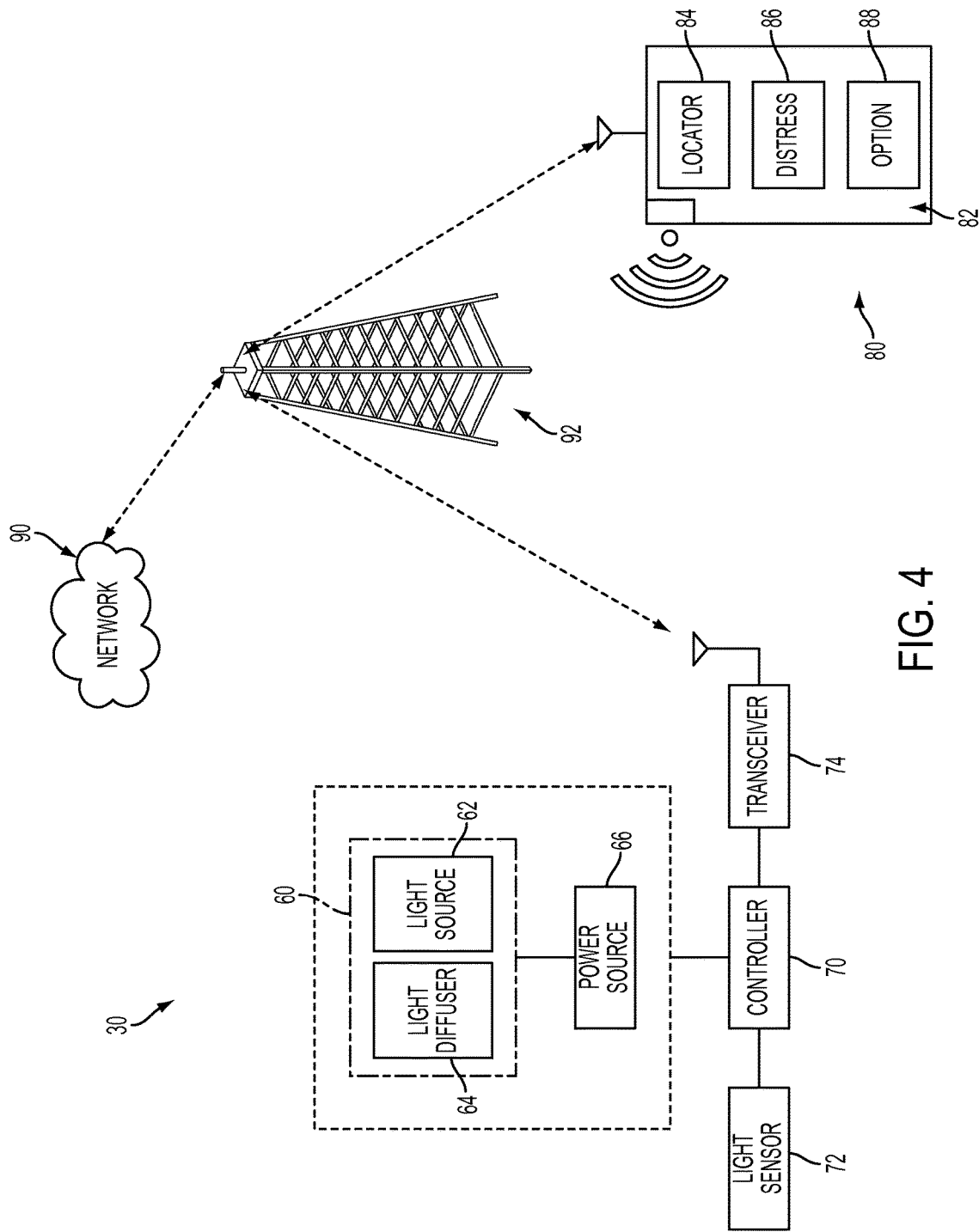

VEHICLE LOCATOR SYSTEM

TECHNICAL FIELD

This patent application relates to a vehicle locator system.

BACKGROUND

Vehicle operators may experience difficulty in locating their vehicle in a large or crowded parking lot. A vehicle operator may use a key fob to flash the vehicle lights or honk the vehicle horn to visually or audibly locate the vehicle. Unfortunately, conventional flashing front and rear lights are oftentimes obscured by surrounding vehicles. Additionally, key fobs may have a limited range requiring the vehicle operator to be fairly close to the vehicle to activate the lights or horn. Once the vehicle operator is within this limited range, the limited visibility or echoing sound may require repeated activation to locate the vehicle with the flashing lights and sounding of the horn annoying others in the area.

SUMMARY

In at least one embodiment, a vehicle may include a vehicle locator system including a light source, a wireless receiver configured to communicate wirelessly with a remote device, and a controller. The controller may be in communication with the wireless receiver and the vehicle locator system. The controller may be configured to activate the vehicle locator system to provide a signal indicative of a vehicle location, responsive to receiving a vehicle location request from the remote device, received through the wireless receiver.

In at least one embodiment, a vehicle locator system is provided. The vehicle locator system may include a sensor in communication with a lighting system, a wireless transceiver, an illumination assembly received within a housing, and a controller. The controller may be configured to command the illumination assembly to emit light according to a first pattern, responsive to a communication from a remote device received through the wireless transceiver. The communication may include a request to operate the illumination assembly in a vehicle locator mode, while a vehicle ignition is off.

In at least one embodiment, a vehicle locator system is provided. The vehicle locator system may include a controller and an illumination assembly having a locking mechanism configured to mount the illumination assembly to a vehicle component. The controller may be in communication with the illumination assembly, a light sensor, and a wireless transceiver in communication with a nomadic device. The controller may be configured to command the illumination assembly to provide an indicator indicative of a vehicle location in response to a signal indicative of ambient light greater than a threshold from the light sensor and a request to activate the illumination assembly from the nomadic device.

Various embodiments may include associated advantages. For example, placing vehicle locator ornaments and/or a lighting assembly at a higher point than the vehicle headlights or taillights, i.e. the tip of an antenna or side of roof racks, improves visibility so that it is easier to spot the lights and locate the vehicle. Embodiments that include a magnetic base mount option can be used to retrofit existing vehicles. The base mount may accommodate a DC battery source to power the LEDs and wireless communication, which may provide communication via Bluetooth or the Internet. Some embodiments include a reserved port or a group of reserved ports at targeted locations on the vehicle roof to facilitate optional access points for future installation of a lighting assembly or vehicle locator system. When not in use, a rubber plug is provided to seal the port. Vehicle locater system access points allow owners to easily incorporate third party or after-market locater systems to create unique expression and customized designs for their vehicles.

BRIEF DESCRIPTION OF THE DRAWINGS

FIG. 1 is a schematic of a vehicle including a vehicle locator system.

FIG. 2 is a cross-sectional view of a vehicle locator system.

FIG. 3 is a view of a vehicle locator system.

FIG. 4 is a schematic of a vehicle locator system in communication with a nomadic device.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments and teachings of the disclosure.

A vehicle operator may attempt to locate his vehicle 10 in a parking lot by depressing a button on a key fob to activate the vehicle horn 12 or the vehicle lighting system 14. The honking of the vehicle horn 12 or the flashing of the vehicle lights of the vehicle lighting system 14 may assist the vehicle operator to audibly or visually locate the vehicle. Unfortunately, the key fob may have a limited range requiring the vehicle operator to be in the immediate vicinity of the vehicle to activate the vehicle horn 12 or the vehicle lighting system 14.

Additional difficulties in visually locating the vehicle may result from the location of the vehicle lighting system 14. The vehicle lighting system 14 may include headlamps 16, tail lights 18, signal lamps disposed on a side view mirror 26, or accent lights that may be obscured by other vehicles or structures in the parking lot.

Similarly, ambient noise of the environment may make it difficult for the vehicle operator to hear the vehicle horn 12 or determine the direction of the sound.

In an effort to avoid these difficulties, the vehicle 10 may be provided with a vehicle locator system 30 disposed at a high point on the vehicle 10. Referring to FIG. 1, the vehicle locator system 30 may be configured to mount directly to the vehicle roof 20, mount to a vehicle component such as an externally mounted vehicle accessory including a vehicle antenna 22, vehicle roof rack 24, side view mirror 26, or be integrated into other vehicle structures, such as a vehicle rear view mirror, hood, trunk, etc.

As shown in FIG. 2, the vehicle locator system 30 may include a housing 32. The housing 32 may have a base 34 and a body 36 connected to the base 34. The base 34 and the body 36 may be formed together as an integral unit or may be provided as separate components configured to cooperate with each other. For example, the base 34 may be provided with an engagement feature that may include a threaded hole. The body 36 may be provided with a corresponding engagement feature that may include a threaded stud configured to engage the threaded hole of the base 34 to removably attach the base 34 and the body 36.

The base 34 may be formed of a molded plastic, synthetic resin or other structural material. The body 36 may also be formed of a transparent or translucent material such as molded plastic or other synthetic material. The body 36 of the housing 32 may define a cavity 38. The cavity 38 may be configured to receive a portion of an externally attached vehicle component such as a mast of the vehicle antenna 22.

The base 34 of the housing 32 may be provided with a locking mechanism. The locking mechanism may be configured to releasably mount the housing 32 of the vehicle locator system 30 to the vehicle 10. The locking mechanism may be further configured to orient the housing 32 such that the body 36 faces in a user-specified direction.

For example, the body 36 may be formed in the shape of various objects such as a character object, a team logo, a car insignia, cartoon characters, various shapes, any personal expression objects, etc. The shape of the body 36 may have a preferred orientation to enable improved visibility or recognition of the body 36, such as the body must face rearward or forward. The locking mechanism may include a set screw/pin to facilitate orientation of the body 36.

The body 36 may be provided with an internal thread (not shown) configured to engage an external thread (not shown) disposed about an end portion of the vehicle antenna 22. The engagement of the internal thread with the external thread my permit the body 36 to be easily mounted to the vehicle antenna 22. The body 36 may also be provided with a pair of electrical contacts that may be disposed within the cavity 38 and configured to connect the vehicle locator system 30 to a power source.

The locking mechanism may include a protrusion 40 configured to engage a port 42 defined within the vehicle roof 20. The combination of the protrusion 40 and the port 42 may be of a tongue and groove configuration. The port 42 may be provided at various locations in the vehicle roof 20 and may be sealed with a rubber plug (not shown) when the port 42 is not in use.

In at least one embodiment, the locking mechanism may include a port 44 provided with a threaded insert. The set screw/pin or locking screw 46 may be inserted through an opening 48 defined by the base 34. The opening may be a through-hole or threaded hole. The locking screw 46 may extend through the opening 48 and engage the threaded insert disposed within the port 44 to mount the housing 32 to the vehicle 10 or externally attached vehicle component.

In at least one embodiment, the locking mechanism may include a magnet 50 disposed proximate the base 34. The magnetic field provided by the magnet 50 may secure the housing 32 to the vehicle roof 20, should the vehicle roof 20 include a ferromagnetic material.

The vehicle locator system 30 may further include an illumination assembly 60 received within the cavity 38 of the housing 32. The illumination assembly 60 may include a light source 62 and a light diffuser 64. The light source 62 may be a light emitting diode (LED), a light emitting electrochemical cell, an electroluminescent wire, an electron stimulated luminescence (ESL) device, an incandescent light bulb, a halogen lamp, a light pipe or tube, a neon or argon lamp, a fluorescent lamp, plasma lamp, xenon flash lamp, a high intensity discharge lamp, or a strobe beacon, for example.

The light source 62 may be a colored light or the body 36 may be colored to enable various color patterns to be emitted. The light source 62 may be disposed proximate the light diffuser 64. The light diffuser 64 may aid in reflecting and spreading the light emitted by the light source 62. The light diffuser 64 may shape the light being provided by the light source 62 to aid in visibility.

Referring to FIG. 3, a vehicle roof rack 24 may be provided with the vehicle locator system 30. The vehicle roof rack 24 may define a cavity or receptacle 52 configured to securely receive the vehicle locator system 30. The vehicle roof rack 24 may be provided if the vehicle antenna 22 is a low-profile or short antenna which may reduce the visibility of the vehicle locator system 30.

Referring to FIG. 4, a power source 66 may be associated with the illumination assembly 60 configured to provide power to the light source 62. The power source 66 may be a battery disposed within the base 34 of the housing 32 of the vehicle locator system 30. The illumination assembly 60 may alternatively be connected to a power source 66 disposed within the vehicle 10. The power source 66 disposed within the vehicle 10 may be the vehicle battery.

The vehicle locator system 30 may be in communication with a controller 70. The vehicle locator system 30 may also be in communication with a sensor 72, the vehicle lighting system 14, and a wireless transceiver 74.

The controller 70 may be included as part of the vehicle locator system 30 or may be a member of an overall vehicle control system. The vehicle control system or the controller 70 may be provided with at least one processor configured to control the vehicle locator system 30, more specifically the illumination assembly 60.

The sensor 72 in communication with the vehicle lighting system 14 may be a light sensor, commonly referred to as a dusk to dawn sensor. When the vehicle ignition is on, the sensor 72 may be configured to monitor or detect the amount of ambient light and provide an ambient light signal. The controller 70 may compare the amount of ambient light with an ambient light threshold. The vehicle lighting system 14 may be activated to provide illumination to aid driver visibility during vehicle operations, in response to an amount of ambient light less than the ambient light threshold. The vehicle lighting system 14 may be deactivated in response to an amount of ambient light greater than the ambient light threshold.

The wireless transceiver 74 may be a combination of a wireless transmitter and a wireless receiver. The wireless transceiver 74 may be integrated with the controller 70. The wireless transceiver 74 may be configured to directly communicate wirelessly with a user's remote device or nomadic device 80.

The nomadic device 80 may be a key fob or a device having wireless connectivity, for example, a cellular phone, a smart phone, a PDA, a computer, etc. The nomadic device 80 may be used to communicate with a network 90 outside of the vehicle 10 through a cellular tower 92. The cellular tower 92 may also be a WiFi access point.

Data communications including locator requests may be communicated between the nomadic device 80 and the network 90 using network communications associated with the nomadic device 80. Alternatively, the wireless transceiver 74 may include a modem having an antenna to communicate with the cellular tower 92 for communicating with the network 90 and ultimately with the nomadic device 80.

In at least one embodiment, the wireless transceiver 74 may be configured to directly communicate with the nomadic device 80 via BLUETOOTH, Radio Frequency (RF) signals, or Near Field Communications (NFC).

The nomadic device 80 may be provided with a user-interface 82. The user-interface 82 may enable a vehicle operator to send and receive data communications including requests to operate the vehicle locator system 30. The data communications may be received by the wireless transceiver 74 and interpreted by the controller 70. The controller 70 may then provide commands to the vehicle locator system 30 to emit light.

The user-interface 82 of the nomadic device 80 may include various options to operate the vehicle locator system 30. The options may be integrated into existing options of the nomadic device 80. For example, while the vehicle ignition is off, a vehicle operator may attempt to locate a vehicle by depressing a button on the key fob, for example the lock button or the panic button. As a result of the depression, the vehicle horn 12 may honk and the vehicle lights of the vehicle lighting system 14 may flash. Additional functionality may be provided to this depression of the button on the key fob, which may result in the vehicle horn 12 honking, the vehicle lights 16 flashing, and the vehicle locator system 30 emitting light in a predetermined pattern or flash.

The user-interface 82 of the nomadic device 80 may include a vehicle locator option 84, a vehicle distress option 86, or a user-programmable option 88. The options may be function keys, buttons, on-screen options, or the like that may enable a vehicle operator to select the desired mode of operation of the vehicle locator system 30, while the vehicle ignition is off and the vehicle operator is attempting to locate the vehicle 10.

The vehicle locator option 84 may operate the vehicle locator system 30 in a first mode of operation. The vehicle distress option 86 may operate the vehicle locator system 30 in a second mode of operation. The user-programmable option 88 may operate the vehicle locator system 30 in a third mode of operation.

In response to a vehicle operator selecting the vehicle locator option 84, while the sensor 72 provides a signal indicative of ambient light greater than an ambient light threshold, the nomadic device 80 may provide a communication to the wireless transceiver 74. The communication may include a vehicle location request and/or a request to operate the vehicle locator system 30 in a vehicle locator mode. The wireless transceiver 74 may receive the request and may activate the vehicle locator system 30.

The controller 70 may command that the vehicle locator system 30 provide a signal or visual indicator indicative of a vehicle location. The command may activate the light source 62 of the illumination assembly 60 to emit light according to a first pattern. The first pattern may be a flashing of the light source 62 or flashing providing a particular color of light to assist the vehicle operator in locating the vehicle 10. The first pattern may be provided for a predetermined period of time or until the driver deactivates the vehicle locator system 30.

In at least one embodiment, when the vehicle operator is attempting to locate the vehicle 10 in a low-light environment, the sensor 72 may provide a signal indicative of ambient light less than an ambient light threshold. In response to a vehicle operator selecting the vehicle locator option 84, in this low-light environment, the nomadic device 80 may provide a communication to the wireless transceiver 74. The communication may include a vehicle location request and/or a request to operate the vehicle locator system 30 in a vehicle locator mode. The wireless transceiver 74 may receive the request and may activate the vehicle locator system 30.

In the low-light environment, the controller 70 may command that the vehicle locator system 30 provide a signal or visual indicator indicative of a vehicle location. The command may activate the light source 62 of the illumination assembly 60 to emit light according to a second pattern. The second pattern may be a flashing of the light source 62 at a different intensity or sequence as compared to the first pattern. The second pattern may also provide a different color of light to assist the vehicle operator in locating the vehicle 10, distinct from the first pattern. The second pattern may be provided for a predetermined period of time or until the driver deactivates the vehicle locator system 30.

In response to a vehicle operator selecting the vehicle distress option 86, the nomadic device 80 may provide a communication to the wireless transceiver 74. The communication may include a vehicle distress request to operate the vehicle locator system 30 in a vehicle distress mode. The wireless transceiver 74 may receive the request and may activate the vehicle locator system 30.

The controller 70 may command that the vehicle locator system 30 provide a visual indicator indicative of distress or a signal indicative of distress. The command may activate the light source 62 of the illumination assembly 60 to emit light according to a third pattern. The third pattern may be a flashing of the light source 62 at a high intensity to provide the "SOS" pattern. The third pattern may also flash providing a particular color of light to assist the vehicle operator or emergency personnel in locating the vehicle 10. The third pattern may be provided for a predetermined period of time or until the vehicle locator system 30 is deactivated.

The user-programmable option 88 may enable the vehicle operator to customize the signal or visual indicator provided by the vehicle locator system 30. The vehicle operator may be able to specify the light pattern or colors via the user-interface 82 of the nomadic device 80.

In response to a vehicle operator selecting the user-programmable option 88, the nomadic device 80 may provide a communication to the wireless transceiver 74. The communication may include a request to operate the vehicle locator system 30 in user-programmable mode. The wireless transceiver 74 may receive the request and may activate the vehicle locator system 30.

The controller 70 may command that the vehicle locator system 30 provide a customized signal or visual indicator. The command may activate the light source 62 of the illumination assembly 60 to emit light according to the user-specified light pattern and/or color. The user-specified pattern may be provided for a predetermined period of time or until the driver deactivates the vehicle locator system 30.

As demonstrated by the representative embodiments described, various embodiments may include associated advantages including remote activation of a lighting assembly at a higher point than the vehicle headlights or taillights, i.e. the tip of an antenna or side of roof racks, which improves visibility to make it easier to spot the lights and locate the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a vehicle locator system including a light source mounted on an exterior roof of the vehicle, the light source disposed within a housing having a protrusion extending from the housing and configured to engage a port in the roof of the vehicle;
 a wireless receiver configured to communicate wirelessly with a remote device; and
 a controller in communication with the wireless receiver and the vehicle locator system, configured to
  activate the vehicle locator system to provide a visible signal from the light source, responsive to receiving a vehicle location request from the remote device through the wireless receiver.

2. The vehicle of claim 1, wherein the controller is further configured to activate the vehicle locator system to provide a signal indicative of distress, responsive to receiving a distress request from the remote device, received through the wireless receiver.

3. The vehicle of claim 1 wherein the vehicle locator system includes a locking mechanism configured to releasably mount the vehicle locator system to the roof of the vehicle.

4. A vehicle comprising:
 a vehicle roof rack having a port;
 a vehicle locator system including a light source within a housing having a protrusion configured to engage the port of the vehicle roof rack;
 a wireless receiver configured to communicate with a remote device;
 an ambient light sensor; and
 a controller configured to activate the light source responsive to receiving a signals from the light sensor, and from the remove device through the wireless receiver.

5. A vehicle locator system comprising:
 a wireless transceiver;
 an ambient light sensor;
 an illumination assembly received within a housing; and
 a controller configured to:
  command the illumination assembly to emit light according to a first pattern, responsive to a vehicle locator mode signal, from a remote device received through the wireless transceiver, and to emit light according to a second pattern in response to a signal from the ambient light sensor.

6. The vehicle locator system of claim 5 wherein the controller is further configured to command the illumination assembly to emit light according to a second pattern responsive to a communication from the remote device received through the wireless transceiver, the communication including a request to operate the illumination assembly in a distress mode.

7. The vehicle locator system of claim 5 wherein the illumination assembly includes a light source disposed within the housing, the housing made of a translucent material.

8. The vehicle locator system of claim 5 wherein the illumination assembly is disposed within a cavity defined by a vehicle roof rack.

9. The vehicle locator system of claim 5 wherein the illumination assembly is disposed about an end of a vehicle antenna.

10. The vehicle locator system of claim 5 further comprising a power source associated with the illumination assembly configured to provide power to the illumination assembly, wherein the power source is disposed within the housing.

11. A vehicle locator system comprising:
 an illumination assembly having a locking mechanism configured to mount to an exterior vehicle component; and
 a controller in communication with the illumination assembly, a light sensor, and a wireless transceiver in communication with a nomadic device, configured to:
  activate the illumination assembly in response to an ambient light signal from the light sensor crossing a threshold and a request to activate the illumination assembly from the nomadic device.

12. The vehicle locator system of claim 11 wherein the controller is further configured to command the illumination assembly to provide an indicator indicative of distress in response to a request to activate the illumination assembly from the nomadic device.

13. The vehicle locator system of claim 11 wherein the controller is further configured to command the illumination assembly to provide an indicator indicative of a vehicle location in response to a signal indicative of ambient light less than the threshold from the light sensor and a request to activate the illumination assembly from the nomadic device.

14. The vehicle locator system of claim 11 wherein the vehicle component is a vehicle roof rack configured to receive the illumination assembly within a receptacle defined by the roof rack.

15. The vehicle locator system of claim 11 wherein the vehicle component is an externally mounted vehicle accessory configured to engage the locking mechanism of the illumination assembly.

16. The vehicle locator system of claim 11 wherein the nomadic device is provided with a user interface configured to communicate with the controller through the wireless transceiver.

* * * * *